United States Patent [19]
Veech

[11] 3,741,196
[45] June 26, 1973

[54] ANIMAL ORGAN EXTRACTION DEVICE
[76] Inventor: Edwards H. Veech, 105 Poquito Road, Shalimar, Fla. 32579
[22] Filed: Feb. 22, 1972
[21] Appl. No.: 227,893

[52] U.S. Cl. ............... 128/1 R, 128/2 B, 128/215
[51] Int. Cl. .......................................... A61b 10/00
[58] Field of Search ................. 128/1 R, 2 R, 2 B, 128/DIG. 1, 218 A, 218 G, 215, 218 R, 329, 330, 303.18, 303.19; 195/1.7, 1.8, 127; 141/329, 330

[56] References Cited
UNITED STATES PATENTS
| | | | |
|---|---|---|---|
| 1,093,112 | 4/1914 | Clarke | 128/2 R |
| 3,219,022 | 11/1965 | Hageheyer | 128/329 X |
| 3,362,406 | 1/1968 | Logsdoll | 141/329 X |

FOREIGN PATENTS OR APPLICATIONS
| | | | |
|---|---|---|---|
| 116,631 | 2/1958 | U.S.S.R. | 128/215 |

*Primary Examiner*—Dalton L. Truluck
*Assistant Examiner*—Lee S. Cohen
*Attorney*—James M. Wetzel et al.

[57] ABSTRACT

An animal organ extraction device including an animal retaining clamp, a discharge probe movably mounted on one side of the clamp and connected to a source of gas under pressure, and a receiving probe movably mounted on the other side of the animal for receiving an organ discharged responsive to application of gas pressure through the discharge probe.

13 Claims, 7 Drawing Figures

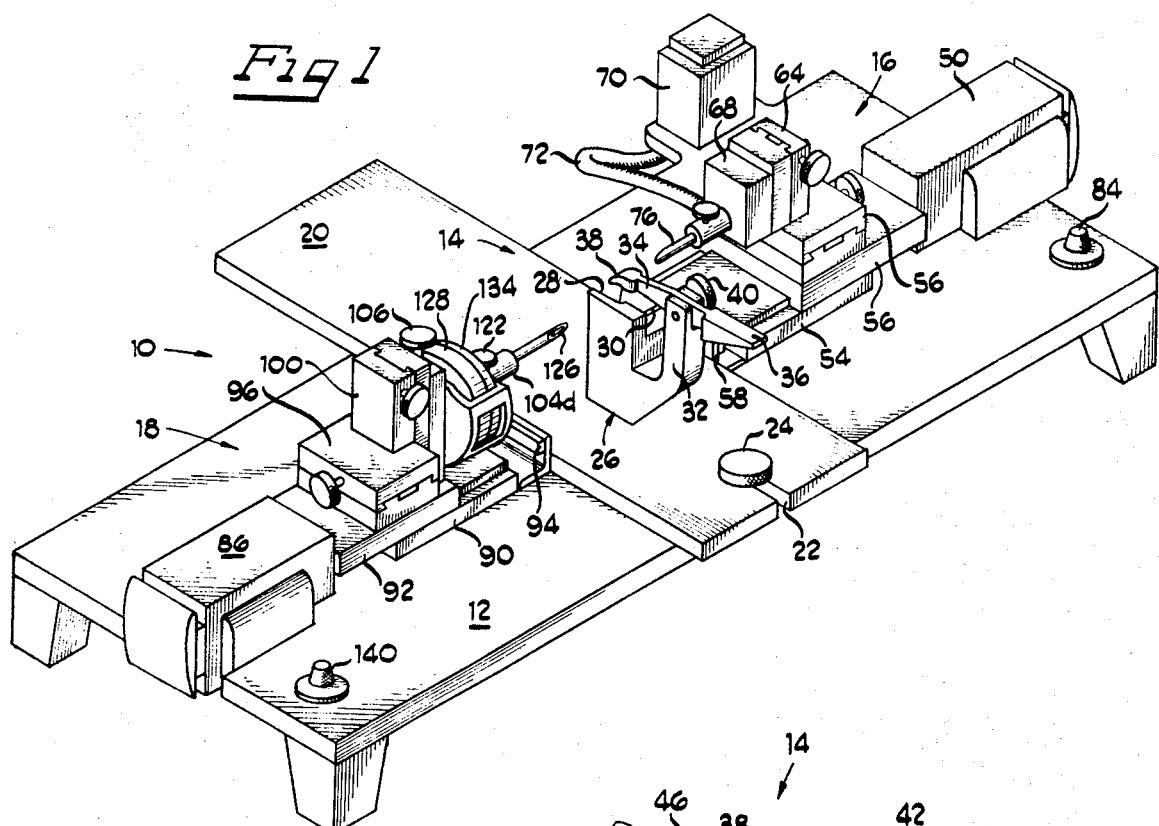
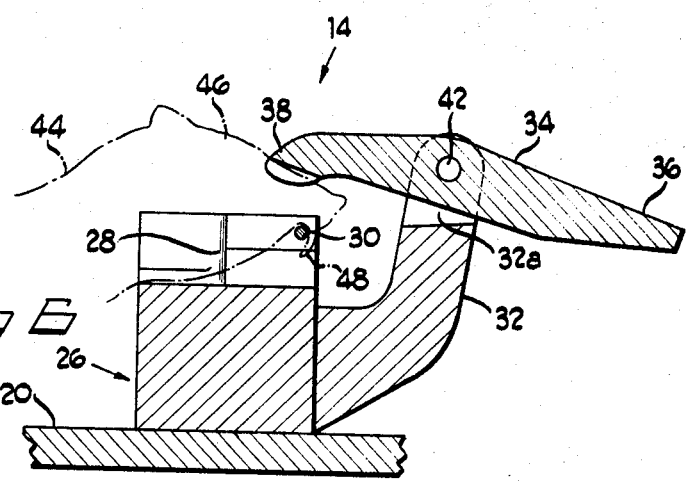
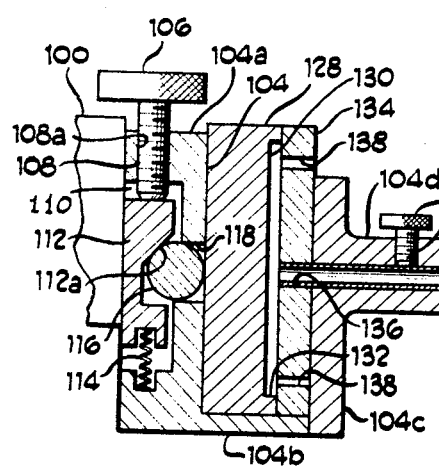

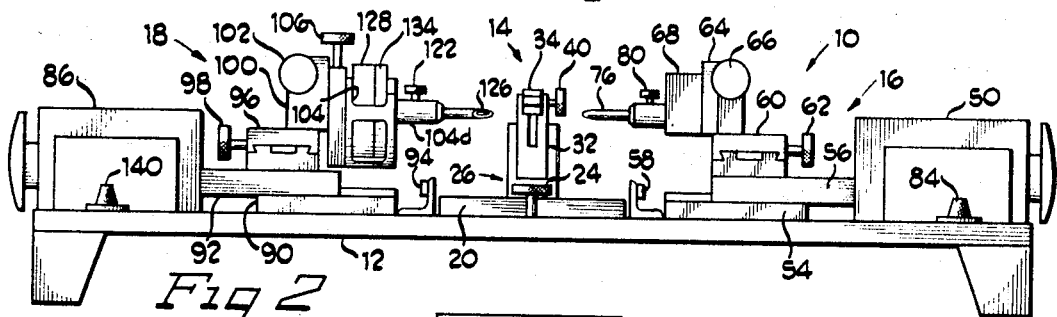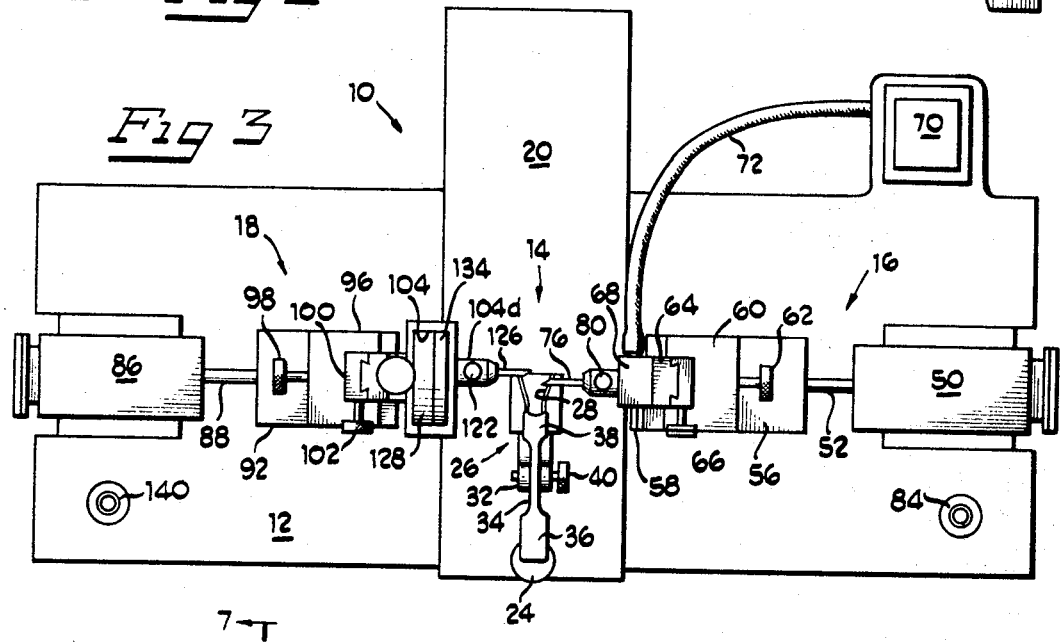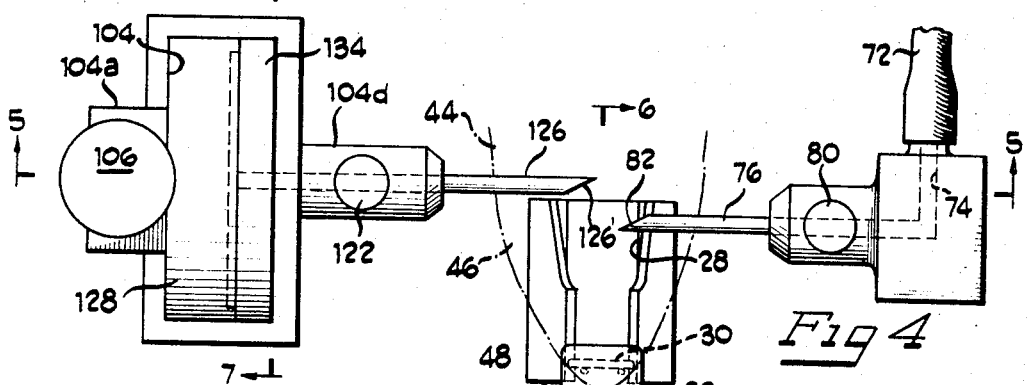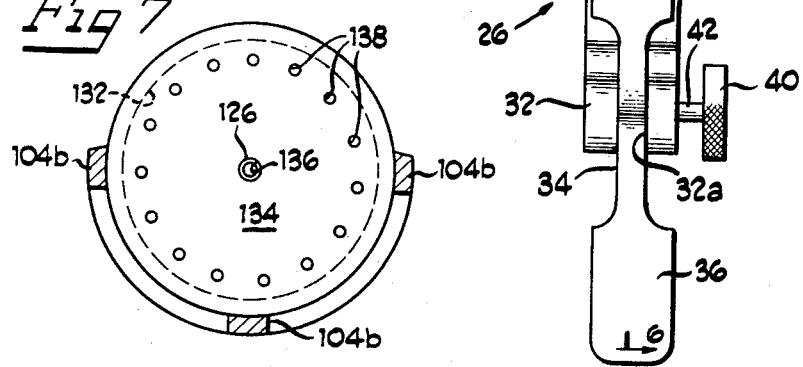

ANIMAL ORGAN EXTRACTION DEVICE

BACKGROUND OF THE INVENTION

1. Field of the Invention

This invention relates to devices utilized in biological research and more particularly to a device for extracting an organ from a live animal.

2. Brief Description of the Prior Art

A great deal of research work relating to human functions and diseases, or animal biology in general, involves the use of animal organs for study. In the chemical study of animal brains it is desirable to have an animal brain with minimal chemical alteration from a "live" condition. One means of preserving animal organs after extraction, is by freezing. However, the chemical composition of the organ may be altered by such factors as the relative state of excitement of the animal prior to extraction of the organ and the length of time required to freeze the organ after extraction.

It is the object of this invention to meet the need and desire in the art for an improved means for extracting animal organs so as to preserve the organ in a state of chemical integrity relative to its condition in a living animal.

SUMMARY OF THE INVENTION

This invention is directed, in brief, to the provision of an improved animal organ extracting device.

The best mode currently contemplated for carrying out the invention includes the provision of an animal holding station with a pivoted clamp for holding the animal, a discharge probe mounted on one side of the holding station for movement into the station and away therefrom, and a receiving probe mounted on the other side of the holding station for movement into the holding station and away therefrom. The discharge probe is connected to gas under pressure for forcing the animal organ outwardly of the body and the receiving probe is generally aligned with the discharge probe and in communication with an organ receiver, which, preferably, is precooled to an extremely low temperature so that the organ will freeze immediately upon contact with the receiver.

BRIEF DESCRIPTION OF THE DRAWINGS

FIG. 1 is a perspective view of the animal organ extraction device of this invention;

FIG. 2 is a front elevational view of the animal organ extraction device of this invention;

FIG. 3 is a top plan view of the animal organ extraction device of this invention;

FIG. 4 is a fragmentary enlarged plan view of the holding staton of the animal organ extraction device of this invention with the organ discharge and receiving assemblies in an operative position with respect to an animal held at the holding station;

FIG. 5 is a section view taken generally along the line 5—5 of FIG. 4;

FIG. 6 is a section view taken generally along the line 6—6 of FIG. 4; and

FIG. 7 is a section view taken generally along the line 7—7 of FIG. 4.

While this invention is susceptible of embodiment in many different forms, there is shown in the drawings and will herein be described in detail a specific embodiment therefor, with the understanding that the present disclosure is to be considered as an exemplification of the principles of the invention and is not intended to limit the invention to the embodiment illustrated.

BRIEF DESCRIPTION OF THE PREFERRED EMBODIMENT

The animal organ extraction device 10 of this invention includes a frame 12 generally comprised of a supporting base plate and depending legs. Preferable the frame 12 is made of a rigid material, such as a suitable metal or the like, for supporting the functional components of the device. Generally speaking the functional components include a holding station 14, an organ discharge assembly 16 and an organ receiving assembly 18.

The holding station 14 includes a base plate 20 having a notch 22 at one end and a locking screw 24 which extends through the notch into the frame 12 for locking the plate 20 in a preselected position of adjustment with respect to the frame 12. The plate 20 supports a holder 26 having a cradle portion 28 configured to recieve a suitable portion of an animal body. In the preferred embodiment, the cradle portion is configured to generally confortable receive the neck and lower jaw portion of a rat. It is to be understood that depending upon the organ desired to be extracted and the animal involved, cradle portion 28 may differ in configuration, but, in any event it is intended to be configured so as to generally comfortably receive an appropriate area of an animal body relative to the organ desired to be extracted. The cradle 28, as shown in the illustrated embodiment, is spanned at one end by the pin 30, which serves as a registering and retaining means.

A leg 32 extends upwardly from holder 26, spaced ahead of the cradle 28 and pin 30, and has a forked end 32. A clamp arm 34 is pivoted in the forked end 32 and includes a handle end 36 and a clamping end 38 which is generally configured to embrace a portion of an animal body. As illustrated, the clamping end 38 may be recessed or relieved to embrace a suitable portion of the animal anatomy which is intended to be held at the holding station 14. A lock screw handle 40 having a threaded shaft 42 which extends through the forked end 32a of the leg 32 is utilized to lock the clamp arm 34 in a desired position for securing a portion of the animal anatomy within the holding station 14.

Specifically, it is intended that the animal organ extraction device of this invention would be utilized in extracting portions of the brain from a rat. As shown in dotted outline in FIGS. 4 and 6 the rat 44 would be positioned at station 14 so that the head 46 is generally embraced in the receiving cradle 28 and clamped by the clamping end 38 of arm 34. The rat is to be so oriented by having the fang 48 of the rat hooked about the retaining pin 30 and the end 38 of the handle 34 bearing downwardly on the forward nose portion of the rat head 46 to securely hold the rat head at the holding station 14.

The discharge assembly 16 is located at one side of the holding station 14. Discharge assembly 16 includes a plunger assembly 50 which may be a solenoid or a piston and cylinder device which has a linerally extendable rod 52. Rod 52 may extend or retract relative to the plunger assembly 50 responsive to actuation thereof. A base guide 54 is positioned adjacent the plunger assembly 50 and a movable base 56 is slidably supported thereon. Movable base 56 is connected to rod 52 for to and fro lateral movement of base 56 with respect to the holding station 14 responsive to actuation of the plunger assembly 50. A stop member 58 is positioned adjacent the holding station 14 for terminating the travel of the movable base 56 and absorbing some of the shock of such termination.

Movable base 56 supports a lateral adjustment block having a locking knob 62 and a vertical adjustment block 64 having a locking knob 66. As illustrated, these preferably comprise dovetail block assemblies for fine lateral and vertical adjustment which may have to be made in the assembly with respect to registration at the holding station 14.

The vertical adjustment block 64 supports a discharge head 68, and frame 12 supports a air valve 70 having a fluid line or air line 72 which communicates with the interior of discharge head 68 and, particularly, through the passage 74 therein. Passage 74 also receives hollow probe 76 which is held therein by virtue of the threaded apperture 78 and a locking screw 80 which extends laterally inwardly to passage 74 to removably clamp or lock the probe 76 therein. Preferably probe 76 has a sharp beveled end 82 for both facilitating insertion through the body of an animal. Preferably the discharge assembly is actuated by means of the actuating button 84.

The receiving assembly 18 is positioned on the frame 12 on the side of the holding station 14 opposite from discharge assembly 16. Receiving assembly also includes a suitable plunger means, such as a piston and cylinder device or solenoid 86 having a linearally extendable rod 88. A base guide 90 is positioned adjacent the plunger means 86 and includes a movable base 92 to which the rod 88 is connected for to and fro movement of the movable base 92 responsive to actuation of the plunger means 86. A stop member 94 is positioned adjacent the holding station 14 to terminate movement of the movable base 92 and absorb some of the impact of such termination.

Th movable base 92 supports a lateral adjustment block 96 having a locking knob 98, and a vertical adjustment block 100 having a locking knob 102, so that suitable adjustments may be made to properly register the receiving assembly 18 with respect to the receiving station 14 and the discharge assembly 16.

The vertical adjustment block 100 supports a semi cylindrical cage-like receptacle 104 having a rear wall 104a, a spaced webs 104b, a forward wall 104c, and a forward extensions 104d. A lock knob 106 extends into the rear wall and has a threaded shank 108 for threaded advancement with respect to the opening 108a in the top of the rear wall. The threaded shank 108 opens into a recess 110 in the interior of the rear wall and abuts against a movable wedge block 112 having a beveled face 112a. The wedge block 112 is normally biased upwardly by spring 114 interposed between the bottom of wedge block 112 and the interior of recess 110. Beveled face 112a of wedge block 112 abuts a ball like locking member that partially occupies opening 118 which opens to the receptable in interior 104. Generally speaking, as the wedge block 112 is depressed responsive to advancement of threaded shank 108, ball 116 will be moved forwardly in opening 118 so that a portion thereof may extend into the cage-like receptacle 104 although such extension will be limited by the relatively reduced size of the opening 118 with respect to ball 116.

Extension 104d has a lateral opening 120 for receiving adjustment knob 122 which may be threaded into the passageway 124. A probe 126 is detachably supported in passageway 124 through the provision of the aforementioned locking knob 122. Preferably probe 126 also has a beveled end 126' for the reasons mentioned with respect to the probe 76.

An organ receiving plate 128 is provided for receiving the organ discharged from the animal. Organ receiving plate 128 is generally a circular cylinder disc having a recessed face 130 forming a thin, peripheral annular shoulder 132. A perforate plate 134 is positioned forwardly of receiving plate 128 in the receptacle 104. The perforate plate 134 is also generally circular cylinderical in configuration and includes a central opening 136 which receives the probe 126. Plate 134 also has a plurality of openings 138 formed adjacent the periphiery thereof and intended to be located in the area of the recessed face 130 of the receiving plate 128. Also, it is intended that the diameter of the receiving plate 128 and perforate plate 134 would be substantially the same and the combined thickness of the two plates including the annular shoulder 132 would be substantially the same as the front to rear dimension of the receptacle 104 so that the plates 128 and 134 would be snugly slideably received within the receptacle 104. By this arrangement only a small amount of advancement of the thread 108 associated with knob 106 would be necessary to move the ball 116 in its opening 118 a distance sufficient to firmly lock the plates 128 and 134 within the receptacle 104.

It is intended that actuating buttons 84 and 140 would be connected with circuitry requiring depressions of both buttons together in order to activate solenoids 50 and 96. This will minimize the likelihood of an unitended actuation of one of the solenoids. In addition, it is contemplated that the valve 70 would be associated with the circuitry of the actuating buttons 84 and 140 by means of a delay element so that valve 70 will not be actuated to release gas under pressure until such time as the probes 76 and 126 pierce the skull of the rat. This timed relationship could also be accomplished by means of a limited switch associated with the stroke of rods 52 and 88.

In operation, a rat is positioned at the holding station 14 with his front fang overhanging pin 30 and the underside of the rat jaw and neck clamped in portion 28. Arm 34 is depressed so that clamp end 38 overlies the top of the rat head and knob 40 is tightened to hold the clamp in that position. As stated, preferably both actuating buttons 84 and 140 must be depressed simultaneously to cause extension of rods 52 and 88. This will cause probes 76 and 126 to pierce through opposite sides of the rat's head, moving from a retracted position, as shown in FIGS. 1 and 2 to an extended position, wherein both probes abut each other, as generally shown in FIGS. 3 and 4. At approximately the same time that the two probes enter into the rat cranium, valve 70 is actuated to feed gas under pressure through line 72 and through discharge probe 76. This will cause a portion of the rat brain to be blown through receiving probe 124 and received on a receiving plate 128.

It is intended that receiving plate 128 and perforate plate 134 would be precooled in liquid nitrogen just prior to initiation of the operation of the device. Thus, receiving plate 128 would be at a sufficiently chilled temperature so that the portion of the rat brain received thereon would be instantly frozen. The simple locking arrangement of knob 106 and wedge 112 and ball 116 permits quick insertion and withdrawal of receiving plate 128 and perforate plate 134 with respect to the cradle 102. The space created by depression 130, and the apertures 138 in perforate plate 134 allow for the escape of gas under pressure supplied from valve 70.

Thus it can be seen that the animal organ extracting device of this invention provides a novel and improved means for extracting an organ from an animal in a chemical condition which is substantially unaltered from its natural state. This is accomplished by retaining the animal in a generally comfortable state at a retaining station and then quickly forcing the organ out of the animal whereupon it is immediately frozen by its contact with a super cooled receiving disc.

The foregoing detailed description has been given for clearness of understanding only and no unnecessary limitations should be understood therefrom as some modifications will be obvious to those skilled in the art.

I claim:

1. An animal organ extraction device, comprising:
   an animal holding station for receiving at least a portion of the animal body, said animal holding station including means for positioning the animal body portion and retaining the same against movement;
   an animal organ discharge assembly positioned adjacent to said holding station, said organ discharge assembly including a discharge probe element which is movable from a first position, relatively removed from said holding station, to a second position, wherein the discharge probe is insertable in an animal portion retained at said holding station;
   an animal organ receiving assembly also positioned adjacent to said holding station in general opposition to said discharge assembly, said organ receiving assembly including a receiving probe element which is movable from a first position, relatively removed from said holding station, to a second position, wherein the receiving probe is inserted in an animal portion retained at said holding station, said organ receiving assembly further including an organ holder in communication with said receiving probe for receiving and holding an animal organ therein,
   means for applying pressure through said animal organ discharge assembly, said means being actuable responsible to movement of said discharge assembly toward said second position,
   whereby, pressure is exerted against an organ of an animal held at said holding station to discharge the organ through said receiving probe and onto said holder.

2. The device of claim 1 wherein said holding station includes separate means for positioning an animal and separate means for comfortably retaining an animal.

3. The device of claim 2 wherein the means for comfortably retaining the animal includes a clamp like assembly including at least one movable jaw, said jaw being movable between an open, animal receiving position, and a closed, animal retaining position, with the assembly configured to comfortably embrace an intended portion of the animal body when the movable jaw is in the closed position.

4. The device of claim 1 wherein the discharge assembly is in communication with a source of gas under pressure for applying pressure through the animal discharge assembly.

5. The device of claim 1 wherein the means for applying pressure includes a source of gas under pressure in communication with the discharge assembly, switch means for releasing gas under pressure from said source, said switch being associated with said discharge assembly for actuation of said switch means when said discharge assembly generally arrives at said second position.

6. The device of claim 5 wherein said discharge assembly probe element comprises a generally hollow tubular member through which gas under pressure is directed.

7. The device of claim 1 wherein the organ holder is removably associated with said receiving station.

8. The device of claim 7 wherein the organ holder includes a receiving plate and a plate holding body for nestably receiving the plate.

9. The device of claim 8 wherein the organ holder further includes a perforate plate between the receiving plate and the receiving probe.

10. The device of claim 9 wherein the perforate plate has a organ passing aperture therein and wherein the receiving probe is a generally hollow tubular structure substantially in alignment with the passing aperture.

11. The device of claim 10 wherein the means for applying pressure includes a source of gas under pressure in communication with the discharge assembly, switch means for releasing gas under pressure from said source, said switch being associated with said discharge assembly for actuation of said switch means when said discharge assembly generally arrives at said second position.

12. The device of claim 11 wherein said holding station includes separate means for positioning an animal and separate means for comfortably retaining an animal.

13. The device of claim 12 wherein the means for comfortably retaining the animal includes a clamp like assembly including at least one movable jaw, movable between an open animal receiving position, and a closed animal retaining position, with the assembly configured to comfortably embrace an intended portion of the animal body when the movable jaw is in the closed position.

* * * * *